United States Patent
Miyasaka

(10) Patent No.: US 10,949,137 B2
(45) Date of Patent: Mar. 16, 2021

(54) GENERATING SPOT-COLOR IMAGE LAYERS IN MULTI-LAYER PRINTING

(71) Applicant: SEIKO EPSON CORPORATION, Tokyo (JP)

(72) Inventor: Yasutake Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/728,867

(22) Filed: Dec. 27, 2019

(65) Prior Publication Data

US 2020/0210117 A1    Jul. 2, 2020

(30) Foreign Application Priority Data

Dec. 28, 2018  (JP) .............................. JP2018-247247

(51) Int. Cl.
   *G06F 15/00*    (2006.01)
   *G06F 3/12*     (2006.01)

(52) U.S. Cl.
   CPC .......... *G06F 3/1208* (2013.01); *G06F 3/1258* (2013.01)

(58) Field of Classification Search
   None
   See application file for complete search history.

(56) References Cited

U.S. PATENT DOCUMENTS

| | | | |
|---|---|---|---|
| 9,888,155 B2* | 2/2018 | Yamanouchi | H04N 1/6008 |
| 2015/0062602 A1 | 3/2015 | Ono et al. | |
| 2016/0246205 A1* | 8/2016 | Hirano | G03G 15/0178 |
| 2018/0170067 A1* | 6/2018 | Heath | B41J 2/2132 |
| 2019/0080479 A1* | 3/2019 | Totsuka | G06T 1/00 |
| 2019/0121588 A1* | 4/2019 | Teruya | G06F 3/1256 |
| 2019/0384551 A1* | 12/2019 | Miyasaka | H04N 1/0044 |
| 2020/0084340 A1* | 3/2020 | Wang | H04N 1/54 |

FOREIGN PATENT DOCUMENTS

JP    2015-049257    3/2015

\* cited by examiner

*Primary Examiner* — Dung D Tran
(74) *Attorney, Agent, or Firm* — Workman Nydegger

(57) ABSTRACT

An image processing device accepts an input from a user via a UI screen displayed on a display unit and includes a control unit. The control unit accepts, via the UI screen, selection of an area of at least one image layer representing an image and included in a print job. The area is selected from among the entire area of the at least one image layer, an image area that is included in the at least one image layer and corresponds to the image, and a non-image area that is included in the at least one image layer and does not correspond to the image. The control unit generates a spot-color image layer having a recorded amount of a spot color specified for the area corresponding to the accepted selection and adds the spot-color image layer to the print job.

6 Claims, 13 Drawing Sheets

FIG. 1
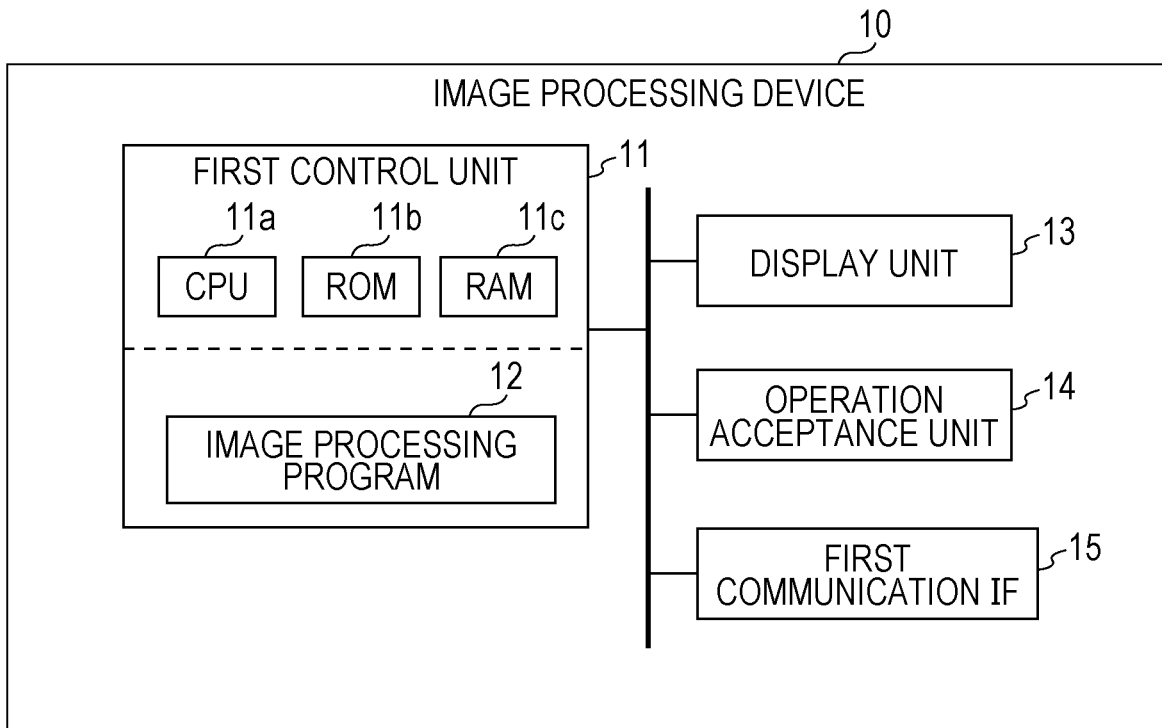
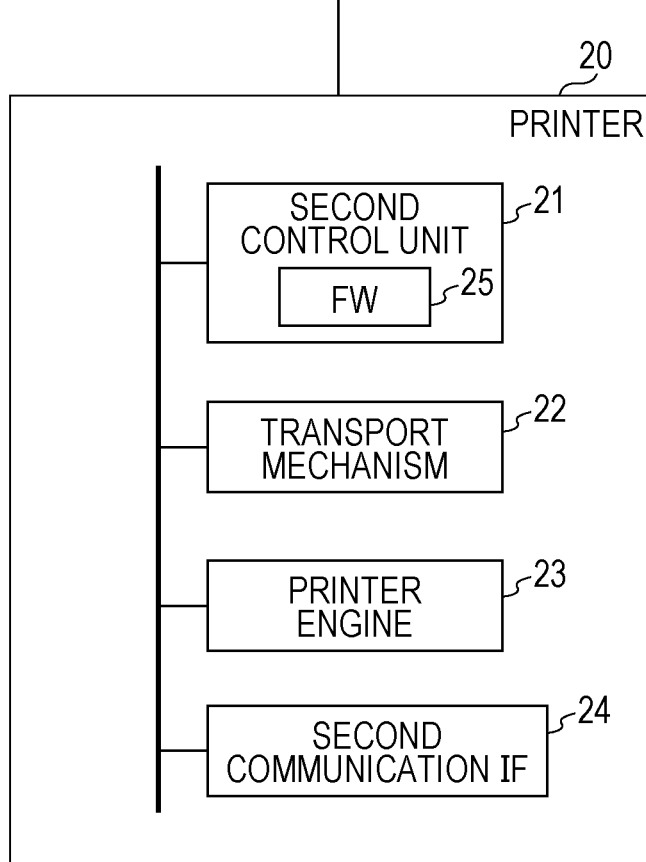

FIG. 5

```
                                            LD
┌─────────────────────────────────────┐
│ JOB ID = 1                          │
│ LAYER ORDER = 0                     │
│ NAME = Layered Image_01             │ ─ LD_1
│ THUMBNAIL IMAGE DATA D10tn          │
│ TYPE = PARENT                       │
├─────────────────────────────────────┤
│ JOB ID = 1                          │
│ LAYER ORDER = 2                     │
│ NAME = Color Image_01               │ ─ LD_2
│ THUMBNAIL IMAGE DATA D12tn          │
│ TYPE = CHILD, COLOR                 │
├─────────────────────────────────────┤
│ JOB ID = 1                          │
│ LAYER ORDER = 1                     │
│ NAME = White Image_01               │ ─ LD_3
│ THUMBNAIL IMAGE DATA D11tn          │
│ TYPE = CHILD, WHITE                 │
└─────────────────────────────────────┘
```

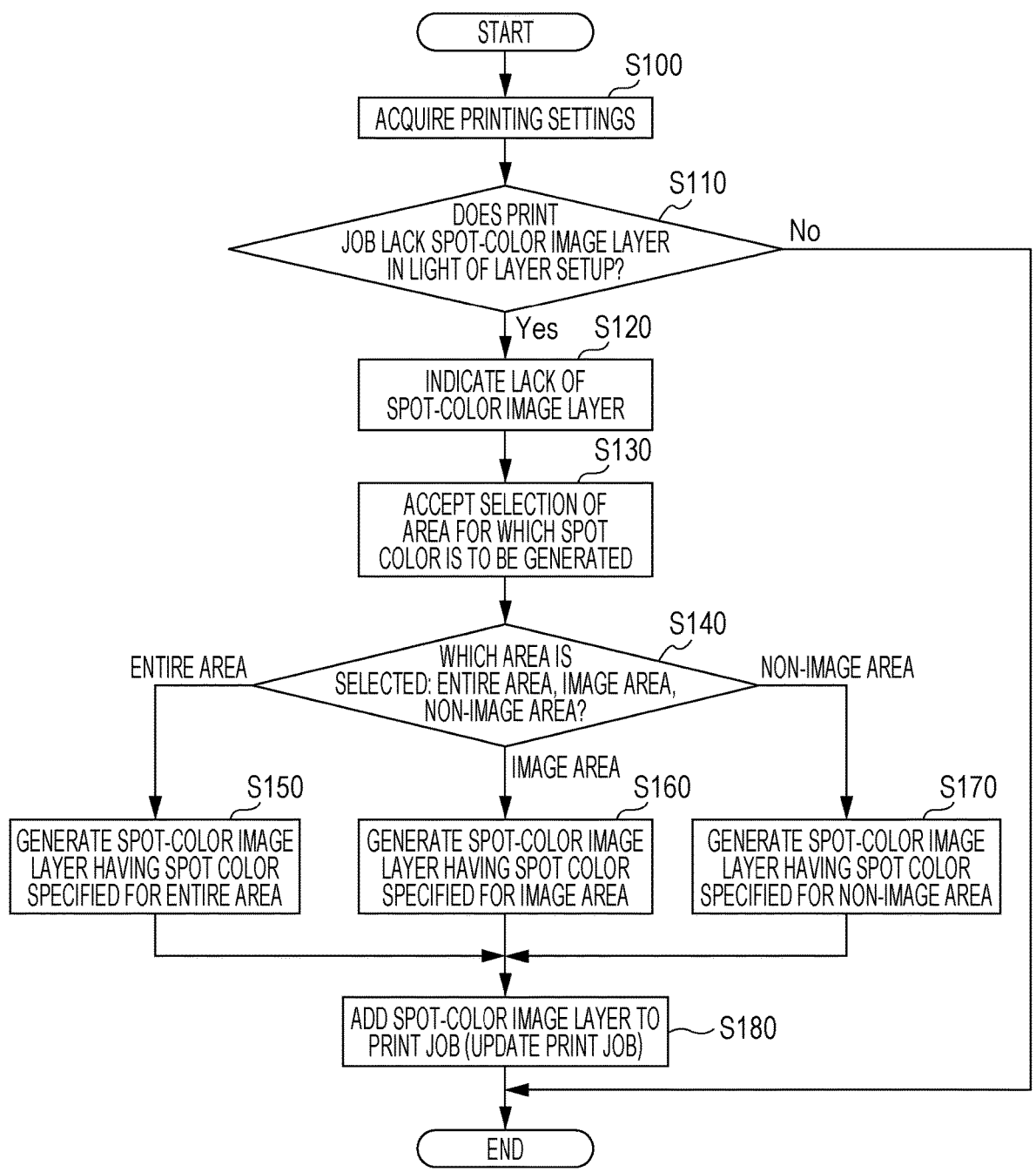

GENERATING SPOT-COLOR IMAGE LAYERS IN MULTI-LAYER PRINTING

The present application is based on, and claims priority from JP Application Serial Number 2018-247247, filed Dec. 28, 2018, the disclosure of which is hereby incorporated by reference herein in its entirety.

BACKGROUND

1. Technical Field

The present disclosure relates to an image processing device that accepts an input from a user via a user interface screen (hereinafter referred to as a "UI" screen). The present disclosure also relates to a non-transitory computer-readable storage medium storing an image processing program.

2. Related Art

A disclosed recording device is configured to record an image by using white ink for forming an underlayer and color inks (black ink, cyan ink, magenta ink, and yellow ink) for forming an image, wherein a preview image of an image to be recorded is displayed on a display unit (see JP-A-2015-49257).

Multilayer printing usually involves printing a spot-color underlayer applied with, for example, white ink on a printing medium, which is then overprinted with an image layer applied with color inks. This procedure typically requires a user to prepare, in advance, a file storing multiple layers including such an underlayer by using an image processing software. Unfortunately, it is burdensome for a user to prepare such a file storing multiple layers. Thus, multilayer printing has been in need of improvement to lighten the workload of a user preparing a spot-color image layer.

SUMMARY

An image processing device accepts an input from a user via a UI screen displayed on a display unit and includes a control unit. The control unit accepts, via the UI screen, selection of an area of at least one image layer representing an image and included in a print job. The area is selected from among the entire area of the at least one image layer, an image area that is included in the at least one image layer and corresponds to the image, and a non-image area that is included in the at least one image layer and does not correspond to the image. The control unit generates a spot-color image layer having a recorded amount of a spot color specified for the area corresponding to the accepted selection and adds the spot-color image layer to the print job.

BRIEF DESCRIPTION OF THE DRAWINGS

FIG. 1 is a simplified diagram illustrating a system configuration.

FIG. 5 is a simplified diagram illustrating the composition of list data corresponding to the print job.

FIG. 6 is a flowchart illustrating spot-color image layer generation processing.

DESCRIPTION OF EXEMPLARY EMBODIMENTS

Figure 2A:
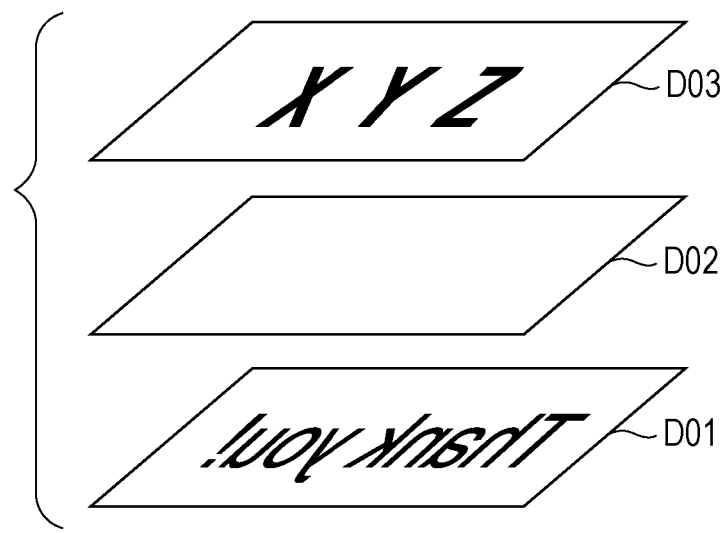
FIG. 2A illustrates an example in which a print job includes three image layers.

An embodiment of the present disclosure will be described below with reference to the accompanying drawings. The drawings are provided merely as examples for describing the present embodiment. The drawings are illustrative and may not be consistent with each other.

1. Overview of System

FIG. 1 is a simplified diagram illustrating the configuration of a system 1 according to the present embodiment. The system 1 includes an image processing device 10 and a printer 20. The system 1 may be referred to as, for example, an image processing system or a printing system.

The image processing device 10 is provided as, for example, a personal computer, a smartphone, a tablet terminal, a mobile phone, or an information processing device having processing capacity comparable to that of the computer, the smartphone, the tablet terminal or the mobile phone. The image processing device 10 includes, for example, a first control unit 11, a display unit 13, an operation acceptance unit 14, and a first communication interface 15. The word "interface" is hereinafter abbreviated as "IF". The first control unit 11 may include: one or more ICs including, for example, a CPU 11a, which is a processor, a ROM 11b, and a RAM 11c; and other nonvolatile memories.

The first control unit 11 controls the image processing device 10 in such a manner that the processor, namely, the CPU 11a executes arithmetic processing in a work area such as the RAM 11c in accordance with programs stored in, for example, the ROM 11b or other memories. The first control unit 11 executes processing in accordance with, for example, an image processing program 12. That is, the image processing program 12 is installed on the first control unit 11. The image processing program 12 functions as a RIP software that generates print data bit-mapped in colors of recording agents to be used by the printer 20 in printing. RIP is an abbreviation of "raster image processor". The processor is not necessarily one CPU. The processing may be executed by more than one CPUs or a hardware circuit such as an application-specific integrated circuit (ASIC) or may be executed by one or more CPUs and a hardware circuit cooperating with each other.

The display unit 13 is a means for displaying visual information and includes, for example, a liquid crystal display or an organic EL display. The display unit 13 may include a display and a drive circuit for driving the display. The operation acceptance unit 14 is a means for accepting an operation performed by the user and is provided as, for example, a physical button, a touch panel, a mouse, or a keyboard. Alternatively, the touch panel may be provided as a function of the display unit 13. The display unit 13 and the operation acceptance unit 14 may be collectively referred to as an operation panel of the image processing device 10.

The display unit 13 and the operation acceptance unit 14 may be part of the configuration of the image processing device 10 or may be a peripheral externally added to the image processing device 10. The first communication IF 15 refers to one or more IFs that enable the image processing device 10 to conduct wired or wireless communication with the outside in accordance with predetermined communication protocols including known communication standards.

The printer 20 includes, for example, a second control unit 21, a transport mechanism 22, a printer engine 23, and a second communication IF 24. The transport mechanism 22 transports a printing medium in a predetermined transport direction. The printing medium is also referred to as media. The printer engine 23 performs, based on print data, printing such as ink jet printing or electrophotographic printing on media transported by the transport mechanism 22. The printer engine 23 performs printing based on print data by applying recording agents of different colors to a piece of media. Each recording agent to be used by the printer 20 is hereinafter referred to as ink. In some embodiments, ink may be replaced with toner. The second communication IF 24 refers to one or more IFs that enable the printer 20 to conduct wired or wireless communication with the outside in accordance with predetermined communication protocols including known communication standards.

The second control unit 21 includes a processor on the printer 20 side and controls each component of the printer 20. The second control unit 21 includes firmware 25. The firmware is abbreviated as FM. In accordance with the FW 25, the second control unit 21 controls, for example, the printer engine 23 based on the print data transmitted by the image processing device 10, and printing is performed accordingly. The image processing device 10 and the printer 20 are connected to each other in a manner so as to conduct wired or wireless communication with each other via the first communication IF 15 and the second communication IF 24. Alternatively, the image processing device 10 and the printer 20 may be connected to each other via a network (not illustrated). The printer 20 may be a multi-function device that serves multiple functions: print functions, scan functions, facsimile communication functions, etc.

The image processing device 10 may be provided as an independent information processing device or may be provided as more than one information processing devices connected to each other in a manner so as to be able to communicate with each other via a network. Alternatively, the image processing device 10 and the printer 20 may be integrated into a single device. Thus, in place of the image processing device 10, the printer 20 may execute the processing described below.

2. Overview of Multilayer Printing

Figure 2B:
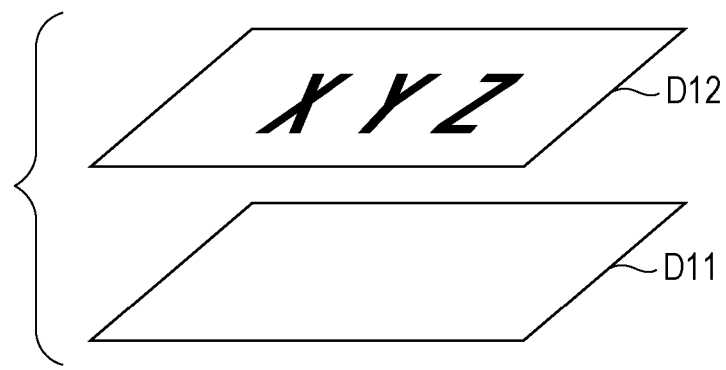
FIG. 2B illustrates an example in which a print job includes two image layers.

In the present embodiment, the image processing device 10 causes the printer 20 to perform multilayer printing based on a print job. FIGS. 2A and 2B are diagrams for providing conceptual illustration of multilayer printing. FIG. 2A illustrates an example in which a print job to be processed by the image processing device 10 includes three image layers, and FIG. 2B illustrates an example in which a print job to be processed by the image processing device 10 includes two image layers.

Referring to FIG. 2A, a print job includes, as image layers, image data D01, D02, and D03 each representing bit map data. The term "plate" may be used to describe each image layer. Each of the image data D01 and the image data D03 is color image data describing images such as computer graphics, photos, and letters. Of pixels constituting the image data, at least some pixels have color information. Specifically, color information refers to gradation values of red, green, and blue (RGB). The image data D02 is spot-color image data describing an image layer to be printed with white (W) ink. The spot-color image data is also referred to as a spot-color image layer. In the present embodiment, white is regarded as a spot color. Of pixels constituting the spot-color image data, at least some pixels have gradation values of the spot color. The gradation values range from 0 to 255, for a total of 256 levels. The gradation value of a spot color is a value directly or indirectly specifying the amount of spot-color ink to be recorded to a printing medium by the printer 20 and is thus regarded as a recorded amount of the spot color.

Referring to FIG. 2B, a print job includes, as image layers, image data D11 and D12 each representing bitmap data. The image data D11 is spot-color image data describing an image layer to be printed with white ink. The image data D12 is color image data. In the present embodiment, spot-color image data describing an image layer to be printed with white ink is also referred to as a white plate.

When performing printing based on the print job including the image data D01, D02, and D03 illustrated in FIG. 2A, the image processing device 10, or more specifically, the first control unit 11 executing the image processing program 12 generates pieces of print data respectively from the image data D01, D02, and D03. Then, the first control unit 11 transmits, to the printer 20, the generated pieces of print data corresponding to the three layers and causes the printer 20 to perform printing based on the pieces of print data. Similarly, when performing printing based on the print job including the image data D11 and D12 illustrated in FIG. 2B, the first control unit 11 executing the image processing program 12 generates pieces of print data respectively from the image data D11 and D12. Then, the first control unit 11 transmits, to the printer 20, the generated pieces of print data corresponding to the two layers and causes the printer 20 to perform printing based on the pieces of print data.

Specifically, when processing color image data, the first control unit 11 subjects the individual pixels having color information to color conversion processing to convert, by using a given look-up table or function, gradation values of RGB to gradation values of, for example, cyan, magenta, yellow, and black (CMYK) corresponding to cyan ink, magenta ink, yellow ink, and black ink to be used by the printer 20. When processing spot-color image data, the first control unit 11 subjects the individual pixels having gradation values of the spot color, namely, white (W), to conversion processing to convert, by using a given look-up table or function, the gradation values of W to gradation values indicating the amount of spot-color ink determined in view of color reproduction properties of the printer 20 and characteristics of media. Furthermore, the first control unit 11 performs gradation conversion by, for example, subjecting the resultant color image data and the resultant spot-color image data to halftone processing and consequently acquires pieces of print data associated with the corresponding image layers.

With an emphasis on ease of understanding, FIGS. 2A and 2B will described below by using, for example, the expression "the color image data D01 is printed", which means that the printer 20 performs printing based on print data generated from the color image data D01 by the first control unit 11. In the example illustrated FIG. 2A, data is printed on media, namely, a transparent film in the order the color image data D01 as the first layer and then the spot-color image data D02 as the second layer, followed by the color image data D03 as the third layer. The spot-color image data D02 provided as the second layer serves as both an underlayer of the color image data D01 provided as the first layer and an underlayer of the color image data D03 provided as the third layer. Thus, an image based on the color image data D01 provided as the first layer is visible through one surface of the transparent film, and an image based on the color image data D03 provided as the third layer is visible on the other surface of the transparent film.

In the example illustrated FIG. 2B, data is printed on media, namely, a sheet of paper in the order the spot-color image data D11 as the first layer and then the color image data D12 as the second layer. The spot-color image data D11 provided as the first layer serves as an underlayer of the color image data D12 provided as the second layer. Thus, an image based on the color image data D12 provided as the second layer is visible.

The spot color is not limited to white. For example, "clear ink" and "metallic color ink" are also regarded as spot-color ink. A print job may thus include, for example, spot-color image data describing, as gradations in the individual pixels, an image layer to be printed with clear ink and/or spot-color image data describing, as gradations in the individual pixels, an image layer to be printed with metallic color ink. A print job may include more than three image layers. Thus, the image processing device 10 is capable of processing a print job including, as image layers, spot-color image data and color image data. The term "metallic color" is hereinafter referred to as "metallic" for short. Spot-color image data describing an image layer to be printed with clear ink may be referred to as a "clear plate", and spot-color image data describing an image layer to be printed with metallic ink may be referred to as a "metallic plate". In the present embodiment, the term "spot color" refers to colors other than colors of inks (e.g., CMYK, light cyan, light magenta, gray, orange, violet) typically used by the printer 20 in color printing. The term "spot color" may be replaced with, for example, "specific color" or "special color".

3. Overview of UI Screen

Figure 3:
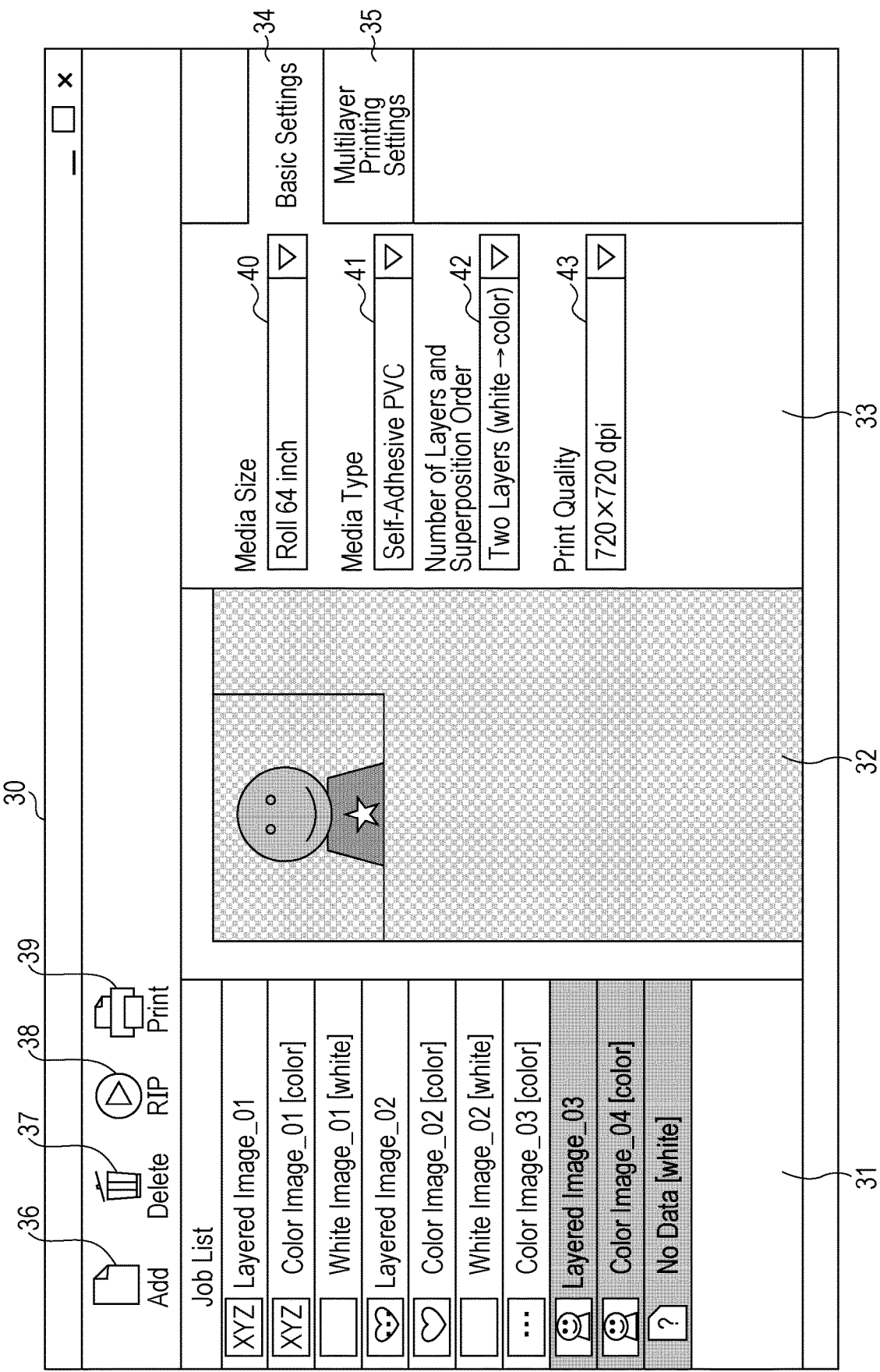
FIG. 3 illustrates an example of an UI screen.
Figure 7:
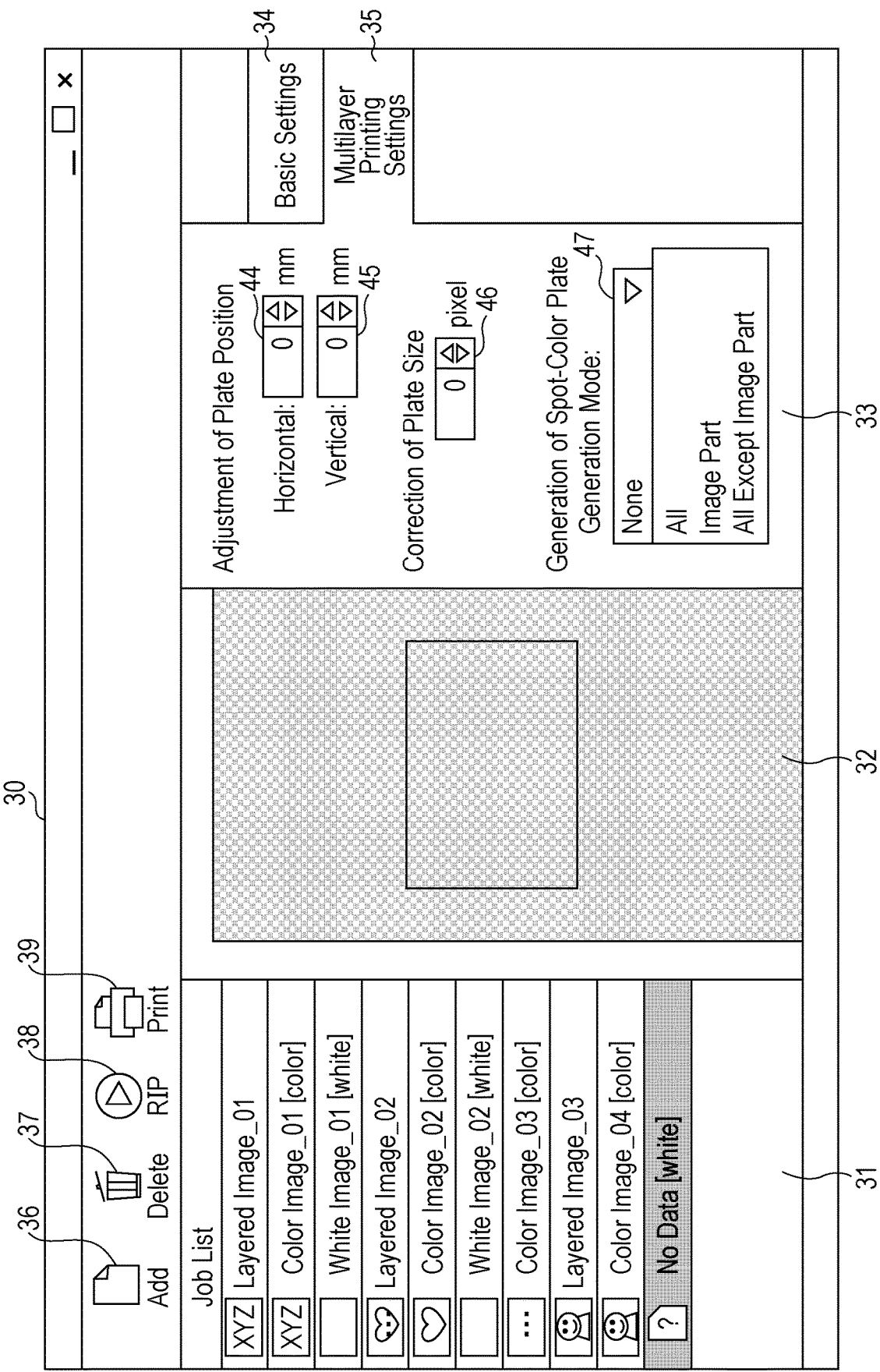
FIG. 7 illustrates another example of the UI screen, on which a tab for multilayer printing settings is selected.
Figure 10:
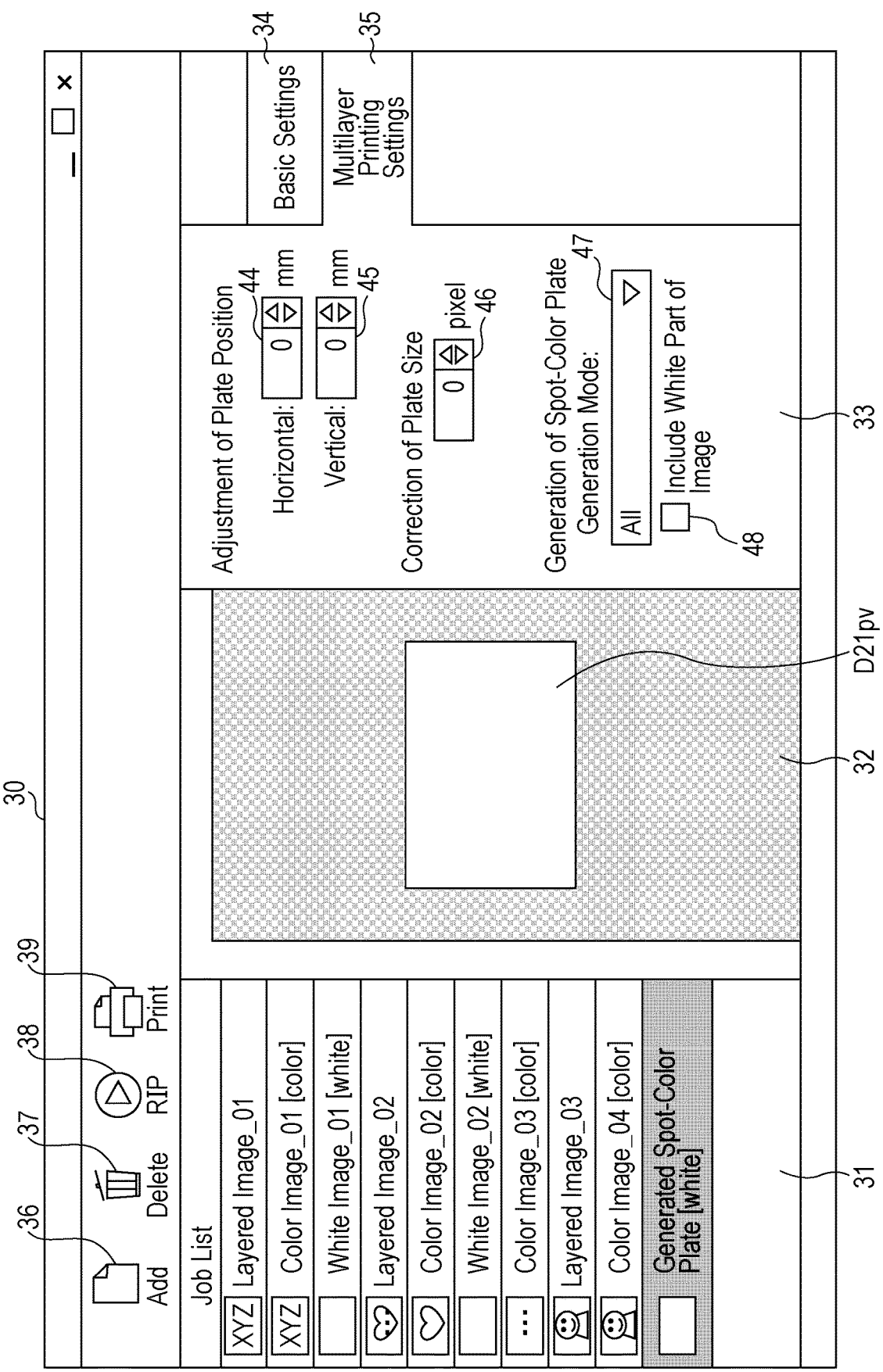
FIG. 10 illustrates still another example of the UI screen, on which "All" is selected as the area for which a spot color is to be generated.

FIG. 3 illustrates a UI screen 30 according to the present embodiment. When accepting, from the user, an operation on the operation acceptance unit 14, the first control unit 11 starts the image processing program 12 and displays the UI screen 30 on the display unit 13 in accordance with the image processing program 12. Similarly, FIGS. 7 and 10 illustrate examples of the UI screen 30.

The UI screen 30 includes a job list pane 31, a preview pane 32, and a printing settings pane 33. Tabs 34, 35, . . . are displayed in the printing settings pane 33. The user may select any one of the tabs, and a UI for printing settings corresponding to the selected tab will be displayed in the printing settings pane 33 accordingly. Referring to FIG. 3, the tab 34 for basic settings is selected. With the tab 34 for basic settings, acceptance fields 40, 41, 42, and 43 are correspondingly displayed in the printing settings pane 33.

The acceptance field 40 is a field for accepting specification of the size of media to be used in printing. The acceptance field 41 is a field for accepting specification of a media type. The acceptance field 42 is a field for accepting specification of the number of (image) layers to be included in a print job and the superposition order of image layers. The superposition order of image layers refers to the order in which the image layers are printed. The acceptance field 43 is a field for accepting specification of print quality. The acceptance fields 40, 41, 42, and 43 have their respective pull-down menus on which the user can make selections to specify the media size, the media type, the number and superposition order of layers, and the print quality.

The UI screen 30 includes an add button 36, a delete button 37, a RIP button 38, a print button 39, etc. The add button 36 is a button for adding a print job to the job list pane 31. When the user performs an operation on the add button 36 and then selects, for example, an image file F, the first control unit 11 reads the image file F from the storage in which the file is saved. The user can select the image file F, which may be saved in a memory or a hard disk drive inside or outside the image processing device 10, a server on a network, or any other storage accessible by the first control unit 11.

Figure 4:
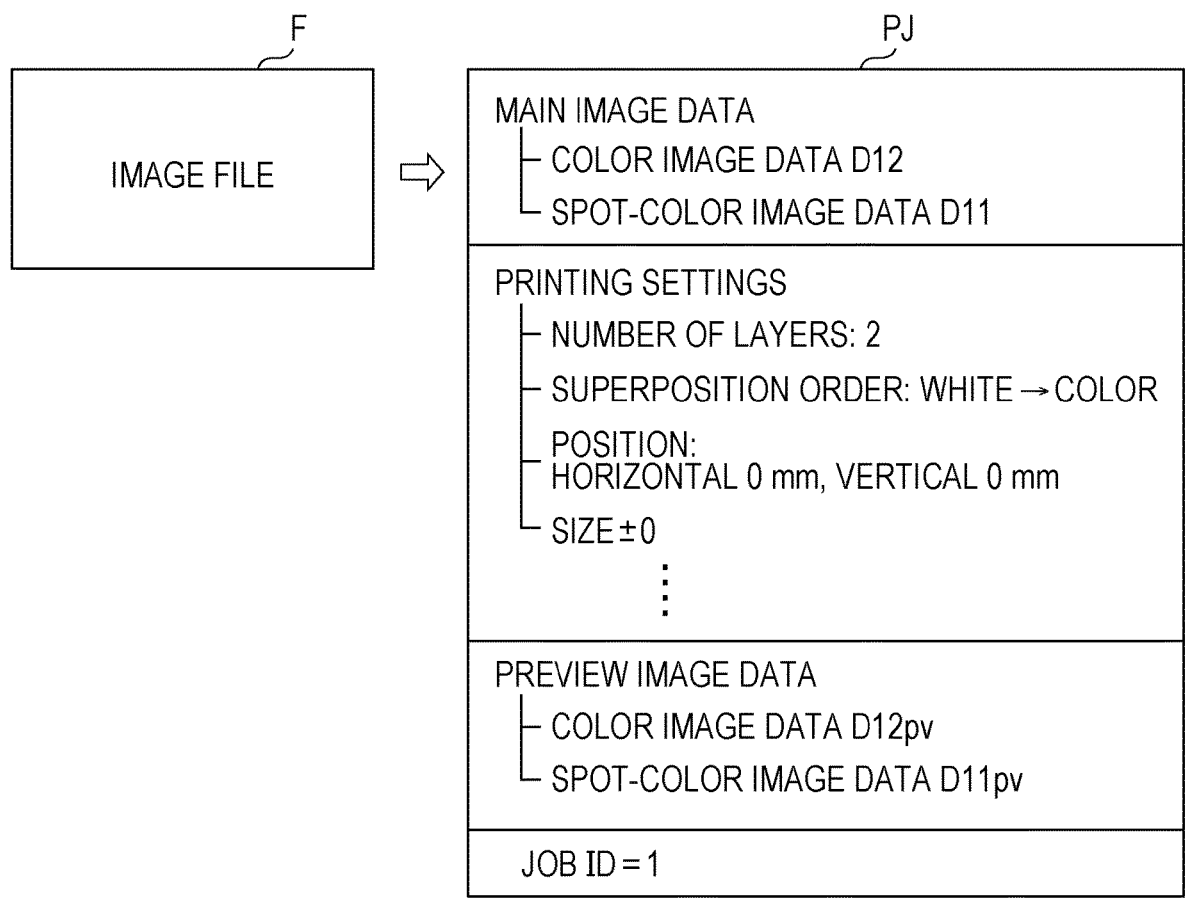
FIG. 4 is a simplified diagram illustrating, for example, the composition of a print job.

FIG. 4 is a simplified diagram illustrating, for example, the composition of a print job. The first control unit 11 generates a print job PJ in a predetermined format from the image file F, which is selected by the user having performed an operation on the add button 36 as mentioned above. The image file F is a file representing an image generated in advance by a given graphics software. The first control unit 11 analyzes the image file F and saves, as part of the print job PJ, the individual image layers constituting the image represented by the image file F. The image represented by the image file F is also referred to as main image data. FIG. 4 is described on the assumption that the main image data represented by the image file F includes the spot-color image data D11 and the color image data D12 illustrated in FIG. 2B. In this case, the first control unit 11 saves the image data D11 and D12 constituting the main image data represented by the image file F. Depending on the format of the image file F, the main image data may be a single piece of image data into which a plurality of image layers are merged. In such a case, the first control unit 11 analyzes the main image data, decomposes the main image data into image layers such as color image data and spot-color image data, and then saves the resultant image layers.

The first control unit 11 generates pieces of preview image data corresponding to the individual image layers saved as part of the print job PJ and then saves the generated pieces of preview image data as part of the print job PJ. In the example illustrated in FIG. 4, the first control unit 11 saves, as preview image data corresponding to one of the image layers, spot-color image data D11$pv$ generated by scaling down the spot-color image data D11 by a predetermined reduction ratio. Similarly, the first control unit 11 saves, as preview image data corresponding to the other image layer, color image data D12$pv$ generated by scaling down the color image data D12 by a predetermined reduction ratio.

The print job PJ also includes information on printing settings. The information on printing settings that is included in the print job PJ is obtained by the first control unit 11 in accordance with an operation performed on the printing settings pane 33. At the point in time when the first control unit 11 generates, in response to the operation performed on the add button 36, the print job PJ based on the image file F selected as described above, no details are provided or given default settings are provided as the printing settings in the print job PJ. The first control unit 11 assigns a job ID to a print job concerned (the print job PJ) to make it distinguishable from other print jobs.

FIG. 5 is a simplified diagram illustrating the composition of list data LD corresponding to the print job PJ. The list data LD is the data for indicating, in the job list pane 31, the presence of a print job (the print job PJ). The first control unit 11 generates the list data LD, associates the list data LD with the print job PJ, and saves the list data LD. The list data LD may be regarded as part of the print job PJ. The list data LD includes data for indicating the corresponding print job PJ and data for indicating the individual image layers included in the print job PJ. The data included in the list data LD and representing the corresponding print job PJ is referred to as parent data, and the data included in the list data LD and representing the individual image layers included in the print job PJ is referred to as child data. In the example illustrated in FIG. 5, LD_1 denotes parent data, and LD_2 and LD_3 denote their respective child data. The child data LD_2 is the data for presenting the color image data D12 in the job list pane 31, and the child data LD_3 is the data for presenting the spot-color image data D11 in the job list pane 31. The data constituting the list data LD, namely, the parent data LD_1 and the child data LD_2 and LD_3 are assigned with the job ID of the associated print job PJ, that is, are assigned with the same job ID.

The data LD_1, LD_2, and LD_3 include, in addition to the job ID, information items such as layer order, name, thumbnail image data, type, etc. The term "layer order" refers to the relative order of the data LD_1, LD_2, and LD_3, which are assigned with the same job ID. It should be noted that the first control unit 11 assigns "layer order=0" to the parent data LD_1. The meaning of "layer order=0" is as follows: with a plurality of pieces of data being assigned with the same job ID, a piece of data assigned with "layer order=0" is displayed in the uppermost field in the job list pane 31. The first control unit 11 may automatically assign numbers associated with the layer order to the child data LD_2 and LD_3. Alternatively, when information directly or indirectly indicating the superposition order of image layers is included in the image file F serving as a basis for generating the print job PJ, the first control unit 11 may set, in accordance with the information, the layer order associated with the child data LD_2 and LD_3. In any case, the layer order is regarded as merely information about the order in which items are listed in the job list pane 31. It should not be understood that the way in which the layer order is determined is limited. The superposition order in which image layers constituting a print job are actually superposed on one another (i.e., print order) is set through the acceptance field 42 in the printing settings pane 33.

The first control unit 11 also names the data LD_1, LD_2, and LD_3 by analyzing the image file F serving as a basis for generating the print job PJ. The first control unit 11 may use, as the name of the parent data LD_1, the name of the image file F without changing it. When the image file F contains names given to the individual image layers, the first control unit 11 may use the names of the individual image layers as the names of the child data LD_2 and LD_3. When the image file F contains no names given to the individual image layers, the first control unit 11 may automatically create different names for different image layers by incorporating the file name of the image file F and give the names to the child data LD_2 and LD_3 or may leave the child data LD_2 and LD_3 unnamed.

Thumbnail image data refers to image data generated by scaling down the original image further than in the case where the corresponding preview image data is generated. Specifically, the first control unit 11 generates thumbnail image data D12$tn$ corresponding to the color image data D12 by scaling down the color image data D12 further than in the case of generating the color image data D12$pv$, adds the thumbnail image data D12$tn$ to the child data LD_2, and then saves the data. The first control unit 11 generates thumbnail image data D11$tn$ corresponding to the spot-color image data D11 by scaling down the spot-color image data D11 further than in the case of generating the spot-color image data D11$pv$, adds the thumbnail image data D11$tn$ to the child data LD_3, and then saves the data. The first control unit 11 generates thumbnail image data D10$tn$ by superposing the thumbnail image data D12$tn$ corresponding to the color image data D12 on the thumbnail image data D11$tn$ corresponding to the spot-color image data D11, adds the thumbnail image data D10$tn$ to the parent data LD_1, and then saves the data.

The first control unit 11 provides, as a data type of the parent data LD_1, information indicating the status as parent data and provides, as a data type of the child data LD_2 and LD_3, information indicating the status as child data. The first control unit 11 also provides, as data types of the child data LD_2 and LD_3, information (e.g., color, white, clear, metallic) indicating that the respective image layers are regarded as color image data or spot-color image data.

Based on the generated list data LD, the first control unit 11 displays, for example, print jobs in the job list pane 31 as illustrated in FIG. 3. In the example illustrated in FIG. 3, "Layered Image_01" in the job list pane 31 represents a print job, and "Color Image_01 [color]" and "White Image_01 [white]" in the job list pane 31 represent respective image layers included in the print job. Specifically, the first control unit 11 displays, in the job list pane 31, a list including: "Layered Image_01" as the name of the print job PJ based on the parent data LD_1 in the list data LD; Color Image_01 [color] as the name and the type of the image layer based on the child data LD_2 in the list data LD; and "White Image_01 [white]" as the name and the type of the image layer based on the child data LD_3 in the list data LD. In addition to the items such as names of print jobs and names of image layers, corresponding thumbnail images in the forms of small rectangles are also displayed in the job list pane 31 as illustrated in FIG. 3. As a matter of course, the thumbnail images in the job list pane 31 are displayed based on the thumbnail image data D10$tn$, D11$tn$, and D12$tn$ in the list data LD. In the example illustrated in FIG. 3, pieces of information on the child data LD_2 and LD_3 having the same job ID are displayed in such a manner that the piece of information on one layer whose number associated with its layer order and included in the list data LD is greater than the number assigned to the other layer is on the upper side of the list.

As described above, the user may perform an operation on the add button 36 and subsequently select the image file F. In response to this operation, the first control unit 11 generates, based on the selected image file F, the print job PJ and the list data LD. Based on the generated list data LD, the first control unit 11 then displays, in the job list pane 31 of the UI screen 30, information indicating the presence of the print job PJ. Thus, the user visually recognizes that the print job is added to the job list pane 31.

For convenience, the print job represented by "Layered Image_01" in the job list pane 31 is referred to as a first print job. The job list pane 31 is a pane in which a job list including one or more print jobs is to be displayed. In the example illustrated in FIG. 3, "Layered Image_02", "Color Image_02 [color]", "White Image_02 [white]", and "Color Image_03 [color]" are also displayed in the job list pane 31 to represent a second print job, which is a job different from the first print job, and image layers included in the second print job. Furthermore, "Layered Image_03", "Color Image_04 [color]", and "No Data [white]" are also displayed in the job list pane 31 to represent a third print job, which is a job different from the first print job and the second print job, and image layers included in the third print jobs. As is the case with the first print job described with reference to FIGS. 4 and 5, the print job PJ and the list data LD based on the image file F selected by the user are generated for each of the second and third jobs, which are then added to the job list pane 31.

It should be noted that the third print job includes only one image layer, which is color image data, and does not include any spot-color image layer at the point in time when the third print job is generated by the first control unit 11 based on the image file F selected by the user. The following takes, as an example, the third print job, which originally includes no such spot-color image layers, to describe processing in which the image processing device 10 automatically generates a spot-color image layer.

4. Automatic Generation of Spot-Color Image Data

FIG. 6 is a flowchart illustrating spot-color image layer generation processing executed by the first control unit 11 in accordance with the image processing program 12. When a predetermined condition is satisfied, the first control unit 11 starts the processing illustrated in the flowchart in FIG. 6. The predetermined condition refers to, for example, the state in which a print job is selected in the job list pane 31. The user performs an operation on the operation acceptance unit 14 to select any one of the print jobs or any one of the image layers in the job list pane 31. With the UI screen 30 being displayed on the display unit 13, when any one of the print jobs is selected in the job list pane 31, the first control unit 11 starts the processing illustrated in the flowchart in FIG. 6.

Referring to FIG. 3, part of the job list pane 31 is shaded in gray, indicating that a print job is selected. In the example illustrated in FIG. 3, when detecting that "Layered Image_03" representing the third print job is selected, the first control unit 11 displays the part of the job list pane 31 including all of "Layered Image_03", "Color Image_04 [color]", and "No Data [white]" in a form (color) different from the form (color) in which the remaining part of the job list pane 31 is displayed. The print job selected in the job list pane 31 is referred to as a "selected print job". In this example, the third print job is a selected print job.

In Step S100, the first control unit 11 acquires printing settings. The printing settings acquired in Step S100 are printing settings currently specified in the printing settings pane 33. In Step S110, the first control unit 11 determines whether the selected print job lacks a spot-color image layer in light of the layer setup included in the printing settings acquired in Step S100. The term "layer setup" refers to the number of layers and the superposition order that are specified in the acceptance field 42 in the printing settings pane 33.

In the example illustrated in FIG. 3, the current layer setup "two layers (white→color)" indicates that the number of layers is two and that the superposition order is "white→color". This means that a white plate, which is a spot-color image layer, is to be printed as the first layer and a color image is to be printed as the second layer on the first layer. As described above, the third print job, which is the selected print job, includes only one image layer, which is a color image layer, and does not include any spot-color image layer. Thus, the first control unit 11 determines lack of a spot-color image layer (i.e., "Yes") in Step S110 and then proceeds to Step S120.

When the selected print job includes a white plate, the selected print job does not lack a spot-color image layer in light of the layer setup "two layers (white→color)", the first control unit 11 determines that the answer in Step S110 is "No" and ends the processing illustrated in the flowchart in FIG. 6. The acceptance field 42 offers the user a wide choice of layer setup options, which include "one layer", "two layers (color→white)", "two layers (metallic→color)", "two layers (color→metallic)", "two layers (color→clear)", "two layers (clear→color)", "three layers (white→color→white)", "three layers (color→white→color)", etc., in addition to "two layers (white→color)". The layer setup "one layer" refers to printing other than multilayer printing, namely, single-layer printing. When the selected print job is the third print job and the layer setup "one layer" is selected, no spot-color image layers are needed, that is, the print job does not lack a spot-color image layer. Thus, the first control unit 11 determines that the answer in Step S110 is "No". Once the first control unit 11 ends the processing illustrated in the flowchart in FIG. 6, the first control unit 11 repeats this processing.

In Step S120, the first control unit 11 indicates, on the UI screen 30, lack of a spot-color image layer as determined in Step S110. When the selected print job is the third print job and the layer setup is "two layers (white→color)" as mentioned above, the selected print job lacks a white plate. Thus, the first control unit 11 indicates, on the UI screen 30, lack of a white plate. The character string "No Data [white]" and a question mark icon beside the character string that are displayed together with "Layered Image_03" in the job list pane 31 illustrated in FIG. 3 are examples of the indications provided in Step S120. At the point in time when "Layered Image_03" representing the third print job and "Color Image_04 [color]" representing an image layer included in the third print job are added to the job list pane 31, the character string "No Data [white]" and the corresponding icon are yet to be displayed, unless the following conditions are satisfied. That is, "Layered Image_03" and "Color Image_04 [color]" are displayed in the job list pane 31 at the point in time when a "Yes" response is returned in Step S110 subsequent to the designation of the third print job as a selected print job.

In Step S130, the first control unit 11 accepts, via the UI screen 30, selection of an area for which a spot color is to be generated during execution of the selected print job. For example, in a state in which lack of a spot-color image layer is indicated, that is, "No Data [white]" is selected in the job list pane 31 on the UI screen 30 as illustrated in FIG. 7, the user selects the tab 35 for multilayer printing settings. With the tab 35 for multilayer printing settings, acceptance fields 44, 45, 46, and 47 are correspondingly displayed in the printing settings pane 33. The tab 35 for multilayer printing settings is selectable in the UI screen 30 only when the number of layers that is specified in the acceptance field 42 in the printing settings pane 33 corresponding to the tab 34 for basic settings is two or more. The acceptance field 44 is a field for accepting an adjustment value associated with the horizontal position of an image layer selected in the job list pane 31, and the acceptance field 45 is a field for accepting an adjustment value associated with the vertical position of the image layer. The acceptance field 46 is a field for accepting a correction value associated with the size of the image layer selected in the job list pane 31.

The acceptance field 47 is a field for accepting selection of an area for which a spot color is to be generated during execution of the selected print job. The acceptance field 47 is a field for accepting selection of a mode of generating a spot-color image layer. The default setting in the acceptance field 47 is, for example, "None". The setting "None" in the acceptance field 47 means that no spot-color image layers are to be generated.

The user can make a selection from the pull-down menu of the acceptance field 47, which includes "All", "Image Part", and "All Except Image Part" as well as "None". "All" refers to the entire area of an image layer included in the selected print job, "Image Part" refers to an image area that is included in the image layer and corresponds to an image, and "All Except Image Part" refers a non-image area that is included in the image layer and does not correspond to the image.

In Step S140, the first control unit 11 branches the processing in accordance with the selection accepted in Step S130. When accepting, through the acceptance field 47, selection of "All", namely, the entire area, the first control unit 11 proceeds to Step S150. When accepting, through the acceptance field 47, selection of "Image Part", namely, the image area, the first control unit 11 proceeds to Step S160. When accepting selection of "All Except Image Part", namely, the non-image area, the first control unit 11 proceeds to Step S170. When "None" is selected in the acceptance field 47, the first control unit 11 ends the processing illustrated in the flowchart in FIG. 6 without performing Steps S150 to S180.

In Step S150, the first control unit 11 generates a spot-color image layer having a recorded amount of a specific color specified for the entire area of the image layer included in the selected print job. As described so far based on the examples illustrated in FIGS. 3 and 7, the selected print job lacks a white plate, which is a spot-color image layer. The first control unit 11 thus generates, as a spot-color image layer, image data whose size (the number of pixels in each row of a matrix and the number of pixels in each column of the matrix) is equal to the size (the number of pixels in each row of a matrix and the number of pixels in each column of the matrix) of the image layer, namely, the color image data included in the selected print job. All pixels in the generated image data have a predetermined gradation value of W.

In Step S160, the first control unit 11 generates a spot-color image layer having a recorded amount of a specific color specified for the image area of the image layer included in the selected print job. When the selected print job lacks a white plate, which is a spot-color image layer, the first control unit 11 generates, as a spot-color image layer, image data whose size is equal to the size of the color image data included in the selected print job. Pixels in the generated image data that overlap the image area of the color image data each have a predetermined gradation value of W. The image area of the color image data refers to part of the color image data, specifically, an area including pixels having color information, namely, gradation values of RGB.

In Step S170, the first control unit 11 generates a spot-color image layer having a recorded amount of a specific color specified for the non-image area of the image layer included in the selected print job. When the selected print job lacks a white plate, which is a spot-color image layer, the first control unit 11 generates, as a spot-color image layer, image data whose size is equal to the size of the color image data included in the selected print job. Pixels in the generated image data that overlap the non-image area of the color image data each have a predetermined gradation value of W. The non-image area of the color image data refers to part of the color image data, specifically, an area provided with no color information.

In step S180, which is performed subsequent to Step S150, S160, or S170, the first control unit 11 adds, to the selected print job, the spot-color image layer generated in the relevant step (Step S150, S160, or S170). That is, the selected print job is updated in such a manner that the generated spot-color image data is included as one of image layers of the selected print job. The processing illustrated in the flowchart in FIG. 6 ends.

Figure 8:
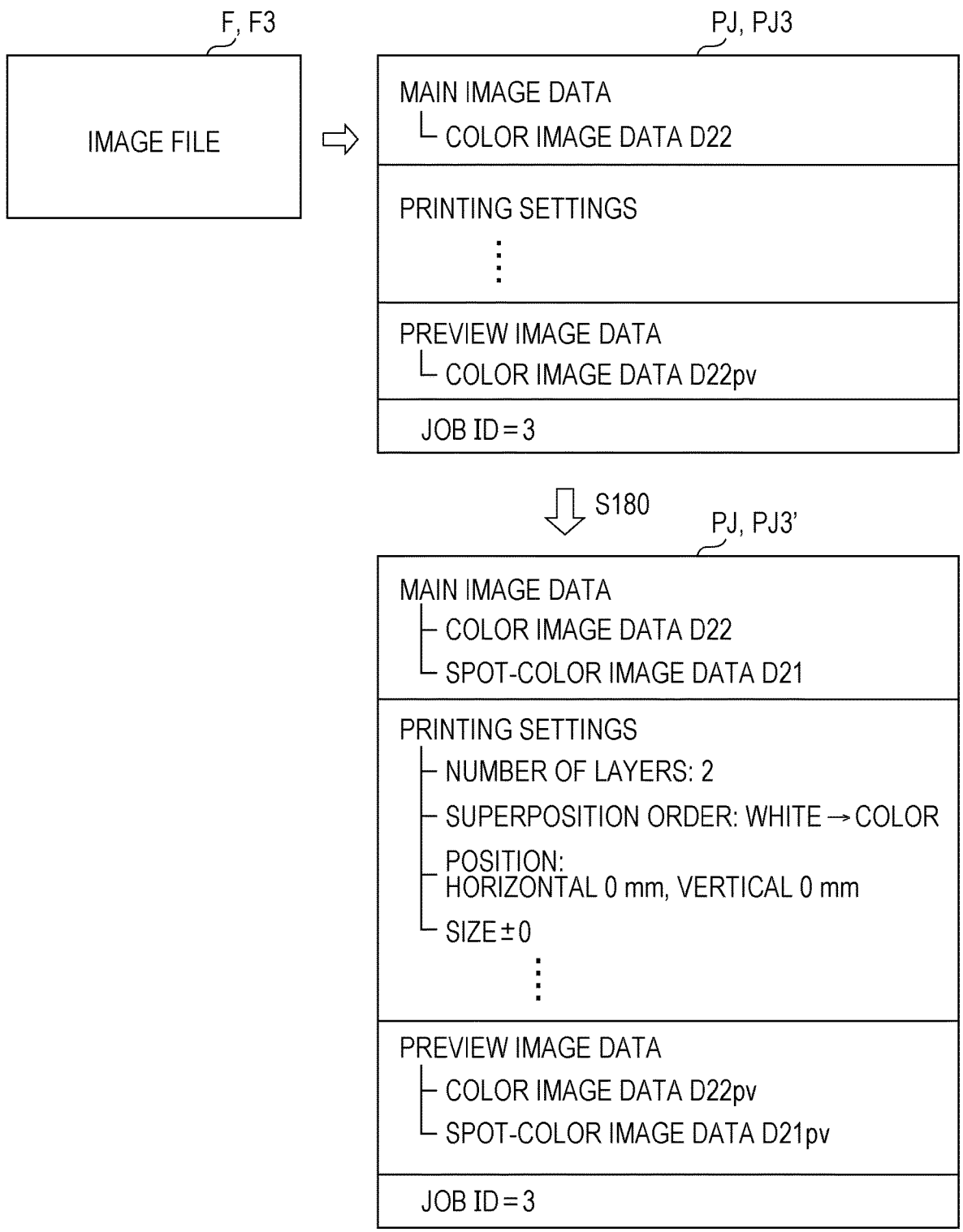
FIG. 8 illustrates updating of a print job according to an embodiment.
Figure 9:
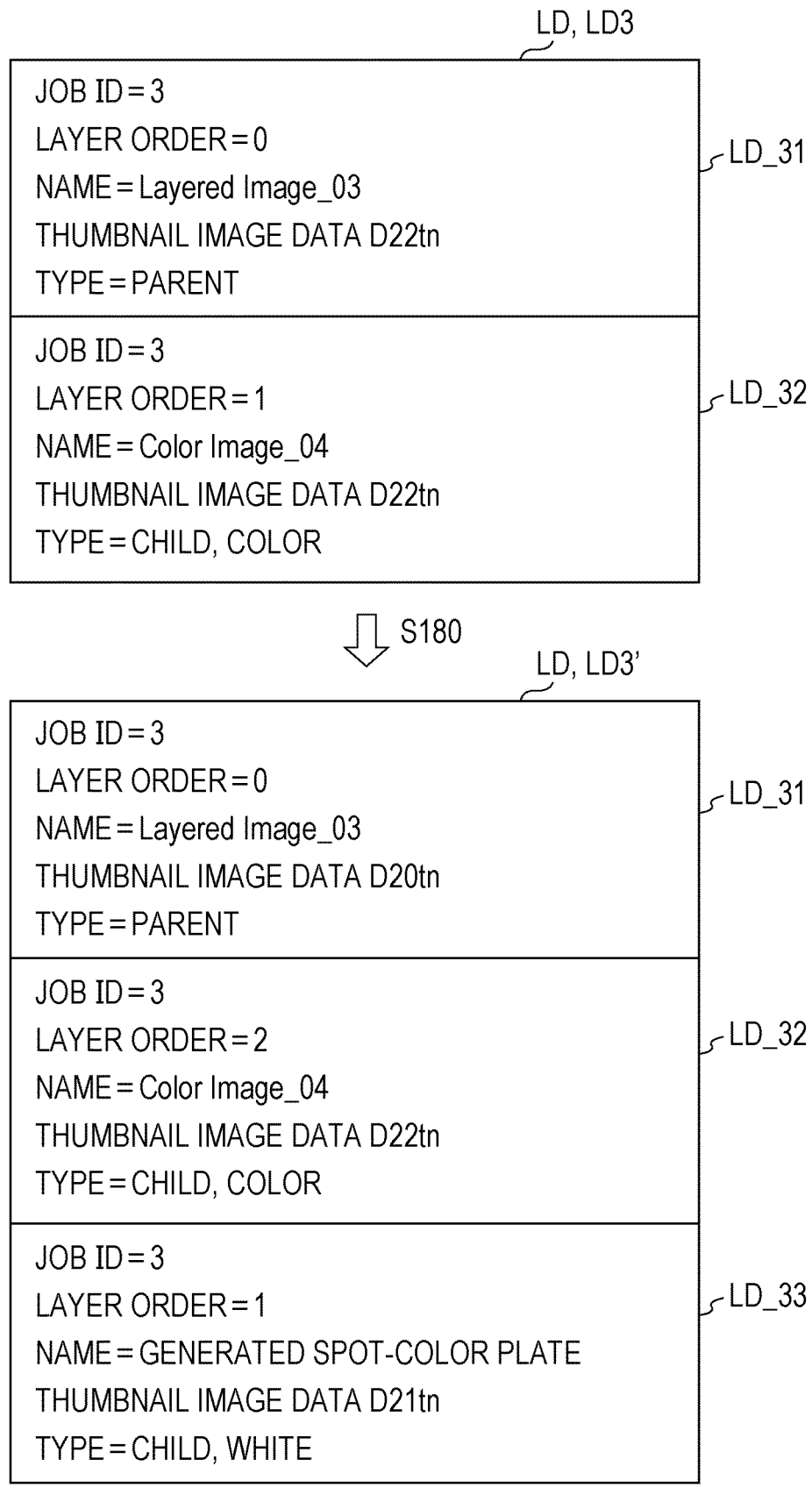
FIG. 9 illustrates updating of list data corresponding to the print job according to an embodiment.

FIG. 8 illustrates an example in which the first control unit 11 updates, in Step S180, the print job PJ, which is the selected print job. FIG. 9 illustrates an example in which the first control unit 11 updates, in Step S180, the list data LD corresponding to the print job PJ, which is the selected print job. As in FIGS. 4 and 5, the print job PJ generated based on the image file F selected by the user and the list data LD corresponding to the print job PJ are illustrated in FIGS. 8 and 9. To be distinguishable from the items illustrated in FIG. 4 or 5, the image file F concerned is denoted by F3, the print job PJ concerned is denoted by PJ3, and the list data LD concerned is denoted by LD3. The print job PJ3 is the third print job described so far.

At the point in time when the print job PJ3 is generated based on the image file F3 by the first control unit 11, data corresponding to one layer, namely, image data D22 alone is included as the main image data. Naturally, image data generated by scaling down the color image data D22, namely, color image data D22$pv$ alone is included as the preview image data current at the point in time when the print job PJ3 is generated based on the image file F3 by the first control unit 11. The print job PJ3 in this state is then updated in Step S180.

In FIG. 8, an update of the print job PJ3 is denoted by PJ3'. The print job PJ3' includes, as part of the main image data, spot-color image data D21, which is a spot-color image layer generated in Step S150, S160, or S170. The print job PJ3' also includes, as part of the preview image data, spot-color image data D21$pv$ generated by scaling down the spot-color image data D21.

The list data LD3 current at the point in time when the print job PJ3 is generated based on the image file F3 by the first control unit 11 is composed of parent data LD_31 for indicating the print job PJ3 and child data LD_32 for indicating the color image data D22, which is an image layer. The child data LD_32 includes thumbnail image data D22$tn$ corresponding to the color image data D22. Along with the print job PJ3, the list data LD3 in this state is also updated in Step S180. In FIG. 9, an update of the list data LD3 is denoted by LD3'. The list data LD3' also includes child data LD_33 for indicating the spot-color image data D21, which is a spot-color image layer generated in Step S150, S160, or S170.

As with the case described above, the child data LD_33 includes various information items such as job ID, layer order, name, thumbnail image data D21$tn$, type, etc. For example, the name "Generated Spot-Color Plate", which is a predetermined name of the spot-color image layer generated in Step S150, S160, or S170, is added to the child data LD_33. The thumbnail data D21$tn$ corresponds to the spot-color image data D21. Following the addition of the child data LD_33, changes are made, as necessary, to some information items of the parent data LD_31 and to some information items of the child data LD_32. For example, the thumbnail image data D20*tn* of the parent data LD_31 included in the list data LD3' are generated in such a manner that the thumbnail image data D22*tn* corresponding to the color image data D22 is superposed on the thumbnail image data D21*tn* corresponding to the spot-color image data D21.

5. Preview on UI Screen

FIG. 10 illustrates the UI screen 30, on which "All" is selected in the acceptance field 47. When "All" is selected in acceptance field 47, the first control unit 11 performs Steps S150 and S180. The selected print job (the print job JP3) and the list data (the list data LD3) corresponding to the selected print job are updated accordingly as described with reference to FIGS. 8 and 9. The first control unit 11 changes, based on the list data LD3, the view in the job list pane 31 as illustrated in FIG. 10. Specifically, "No Data [white]" indicating lack of a spot-color image layer in the print job "Layered Image_03" and the corresponding icon are changed respectively to "Generated Spot-Color Plate", which is the name of the generated spot-color image layer, and thumbnail image data (e.g., the thumbnail image data D21*tn* in FIG. 9) of the generated spot-color image layer.

The first control unit 11 displays, in the preview pane 32, a preview of a print job or image layer selected in the job list pane 31. Specifically, when a print job is selected in the job list pane 31, the first control unit 11 generates preview image data by superposing, in the superposition order specified as a layer setup, preview image data representing the individual image layers included in the selected print job and then displays the generated preview image data in the preview pane 32. When an image layer is selected in the job list pane 31, the first control unit 11 displays, in the preview pane 32, preview image data representing the selected image layer.

Referring to FIG. 10, "All" is selected in the acceptance field 47 and "Generated Spot-Color Plate" is selected in the job list pane 31. The first control unit 11 thus displays, in the preview pane 32, a view based on the spot-color image data D21*pv*, which is preview image data included in the print job PJ3'. Referring to, for example, FIG. 10, the preview pane 32 has a background in a white-and-gray checkered pattern. The checkered pattern is an example of a predetermined pattern of the background of the preview pane 32. The preview pane 32 may have, as a background, a texture or a pattern other than the checkered pattern, such as a dot pattern or a hatch pattern.

As described above in relation to Steps S150, S160, and S170, all or part of the pixels in the white plate, which is a spot-color image layer, have gradation indicating the darkness of white. When a preview of the white plate is displayed in the preview pane 32 having a typical solid-white background, the area in the white plate that has a gradation value of W is indistinguishable from an area that does not have a gradation value of W. As a workaround, the first control unit 11 provides the preview pane 32 with a background having a predetermined pattern so that the user can distinguish the area of the white plate that has a gradation value of W from the area that does not have a gradation value of W. A black frame in the preview pane 32 indicates the periphery of the preview image data. In the example illustrated in FIG. 10, the entire area of the preview based on the spot-color image data D21*pv* is displayed as a white area in the preview pane 32. This preview represents a white plate having a recorded amount of white specified for the entire area of an image layer of a print job.

Figure 11A:
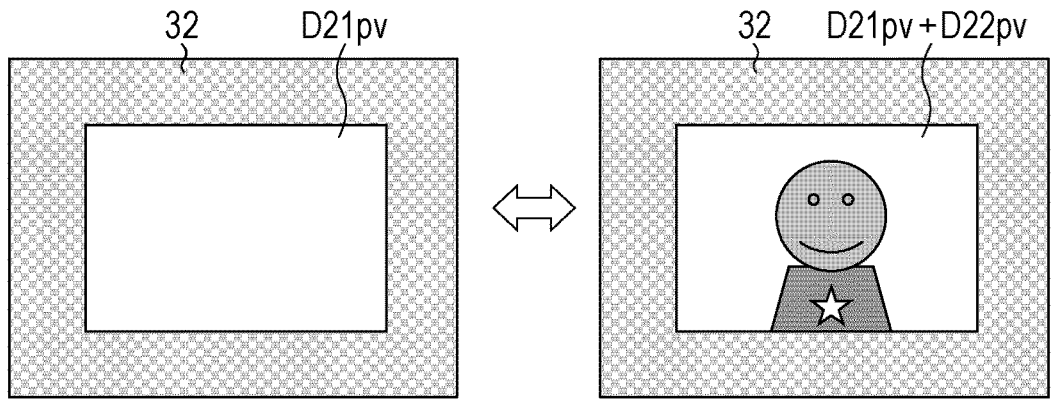
FIG. 11A illustrates an example preview that is displayed when "All" is selected.
Figure 11B:
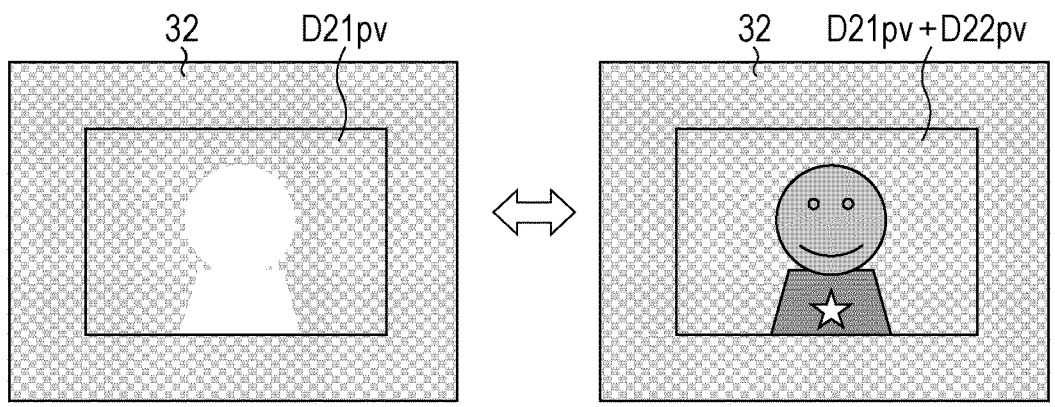
FIG. 11B illustrates an example preview that is displayed when "Image Part" is selected.
Figure 11C:
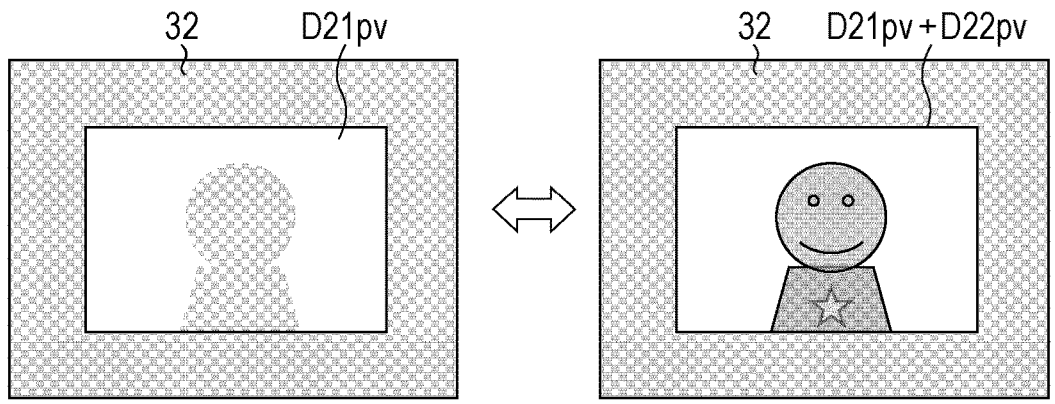
FIG. 11C illustrates an example preview that is displayed when "All Except Image Part" is selected.

FIG. 11A is an enlarged view of part of the preview pane 32, illustrating a preview that is displayed in the preview pane 32 when "All" is selected in the acceptance field 47. FIG. 11B is an enlarged view of part of the preview pane 32, illustrating a preview that is displayed in the preview pane 32 when "Image Part" is selected in the acceptance field 47. FIG. 11C is an enlarged view of part of the preview pane 32, illustrating a preview that is displayed in the preview pane 32 when "All Except Image Part" is selected in the acceptance field 47.

Previews that are displayed when "Generated Spot-Color Plate" is selected in the job list pane 31 are presented on the left side of FIGS. 11A, 11B, and 11C. Previews that are displayed when "Layered Image_03", which is the third print job, is selected in the job list pane 31 are presented on the right side of FIGS. 11A, 11B, and 11C. In other words, previews on the left side of FIGS. 11A, 11B, and 11C are based on spot-color image data D21*pv* of the print job PJ3', and previews on the right side of FIGS. 11A, 11B, and 11C are based on preview image data generated by superposing the color image data D22*pv* of the print job PJ3' on the spot-color image data D21*pv* of the print job PJ3'. In the example illustrated in FIG. 11, the color image data D22*pv*, namely, the color image data D22 originally included in the print job PJ3 represents a portrait. The portrait represented by the color image data D22 is herein referred to as an object. As a matter of course, the object may be any image, such as a computer graphics, a photo, and a character.

The left side of FIG. 11A illustrates the preview pane 32 provided in the state illustrated in FIG. 10. The preview illustrated in FIG. 11A enables, prior to printing, the user to make sure that white ink is recorded to the entire area of the image layer including the object and to check the relationship between the white ink and the object. The preview illustrated in FIG. 11B enables, prior to printing, the user to make sure that white ink is recorded only to the area corresponding to the object (i.e., the image area) and to check the relationship between the white ink and the object. The preview illustrated in FIG. 11C enables, prior to printing, the user to make sure that white ink is recorded only to the area that does not correspond to the object (i.e., the non-image area) and to check the relationship between the white ink and the object.

When displaying a preview as illustrated in FIG. 11C, the first control unit 11 may subject, to transparency processing associated with the color information (i.e., the color of the object), the color image data D22*pv*, which is to be superposed on the spot-color image data D21*pv*. When the object is made transparent, the pattern of the background of the preview pane 32 can be seen through the area corresponding to the object. Thus, the user can clearly recognize that white ink is not recorded to the underlayer of the object.

As illustrated in FIG. 4 or 8, the first control unit 11 stores, as the printing settings information in the print job PJ, information accepted through the acceptance fields 40, 41, 42, 43, 44, 45, and 46 in the printing settings pane 33. This means that printing settings information in a print job is updated in response to an operation on the printing settings pane 33 performed by the user. The user may specify, in the printing settings pane 33, various printing settings items, such as N-up printing, number of copies, and color correction, in addition to the printing settings items in FIGS. 3, 7, and 10.

The delete button 37 included in the UI screen 30 is a button for deleting, from the job list pane 31, a print job selected in the job list pane 31. The RIP button 38 is a button for generating print data based on a print job selected in the job list pane 31. When detecting an operation performed on the RIP button 38 in a state in which any one of the print jobs in the job list pane 31 is selected, the first control unit 11 generates pieces of print data corresponding to the individual layers of the main image data included in the selected print job.

As mentioned above, the print button 39 is a button for executing the print job selected in the job list pane 31. When detecting an operation performed on the print button 39 in a state in which any one of the print jobs in the job list pane 31 is selected, the first control unit 11 transmits, to the printer 20 via the communication IF 15, the pieces of print data generated from the individual image layers included in the selected print job. Together with the generated pieces of print data, information on printing settings associated with the selected print job is transmitted to the printer 20 by the first control unit 11. When the printer 20 receives the pieces of print data and the information on printing settings from the image processing device 10, the second control unit 21 of the printer 20 causes the printer engine 23 to perform, on the media, multilayer printing based on the pieces of print data corresponding to the individual image layers and in accordance with the printing settings including information on various items such as the superposition order of image layers, position adjustment values, and size correction values.

6. Conclusion

According to the present embodiment, the image processing device 10 accepts an input from a user via the UI screen 30 displayed on the display unit 13. The image processing device 10 includes the first control unit 11. The first control unit 11 accepts, via the UI screen 30, selection of an area of at least one image layer representing an image and included in a print job. The area is selected from among the entire area of the at least one image layer, an image area that is included in the at least one image layer and corresponds to the image, and a non-image area that is included in the at least one image layer and does not correspond to the image. The first control unit 11 generates a spot-color image layer having a recorded amount of a spot color specified for the area corresponding to the accepted selection and adds the spot-color image layer to the print job.

With this configuration, the first control unit 11 generates, for a print job that does not include a spot-color image layer such as a white plate, clear plate, or a metallic plate, a spot-color image layer in accordance with selection of an area accepted from the user via the UI screen 30 and adds the generated spot-color image layer to the print job. This configuration lightens the workload of the user preparing a spot-color image layer for multilayer printing.

Multilayer printing in which an image layer representing an image (i.e., an object) is printed on a transparent medium such as film is known. Multilayer printing may involve applying, as an underlayer of the image layer, white ink to an area corresponding to the entire area of the image layer. The process of printing an image layer representing an image on a medium may include applying, as an underlayer, white ink only to an image area. This enables colors of the image to come out well with a minimum consumption of white ink. Alternatively, the process of printing an image layer representing an image on a medium may include applying white ink only to a non-image area. Consequently, the color of the medium, creases and opacities in the medium, etc., may be concealed. According to the present embodiment, simply selecting, on the UI screen 30, an area as described above is all that is required of the user to cause the image processing device 10 to generate a spot-color image layer suited to a desired type of multilayer printing selected from the aforementioned types of multilayer printing.

As the present embodiment, the image processing program 12 that causes a computer (the CPU 11a) to execute processing for accepting an input from a user via the UI screen 30 displayed on the display unit 13 is disclosed. The image processing program 12 causes the computer to perform: the function of accepting, via the UI screen 30, selection of an area of at least one image layer representing an image and included in a print job. The area is selected from among the entire area of the at least one image layer, an image area that is included in the at least one image layer and corresponds to the image, and a non-image area that is included in the at least one image layer and does not correspond to the image; and the function of generating a spot-color image layer having a recorded amount of a spot color specified for the area corresponding to the accepted selection and of adding the spot-color image layer to the print job. The processing performed by the image processing device 10 in accordance with the image processing program 12 may be regarded as a method including one or more steps.

7. Other Embodiments

Various embodiments other than the embodiment described above are also embraced herein. As described so far, when accepting selection of an image area via the UI screen 30 in Step S130, the first control unit 11 generates, in Step S160 on a branch line extending from Step S140, a spot-color image layer having a recorded amount of a spot color specified for the image area of the image layer. This is indicative of the following: when a white area is included as part of the image area, a spot-color image layer having a recorded amount of the spot color (i.e., white) specified for the image area including the white area is generated.

The term "white area" refers to part of an image area of color image data that is an image layer, specifically, an area including pixels whose gradation values of RGB are set to a maximum value of 255. For such a white area, the amount of cyan ink, the amount of magenta ink, the amount of yellow ink, the amount of black ink are, in principle, all set to 0 as a result of color conversion processing through which print data is generated from the color image data. When the printing is based only on color image data, the white area has no ink recorded thereto and is thus rendered in the color of the media, as in the case with a non-image area that does not have color information. In multilayer printing, the user may prefer to use white ink to print the white area or may prefer not to use white ink to print the white area.

With this in view, when accepting selection of the image area, the first control unit 11 accepts, via the UI screen 30, selection of whether to specify a recorded amount of the spot color (i.e., white) for a white area that is included as part of the image area and has color information associated with white. When accepting selection of a setting in which a recorded amount of white is specified for the white area, the first control unit 11 may generate a spot-color image layer having a recorded amount of white specified for the image area including the white area. When accepting selection of a setting in which a recorded amount of white is not specified for the white area, the first control unit 11 may generate a spot-color image layer having a recorded amount of white specified for the image area except for the white area.

Figure 12:
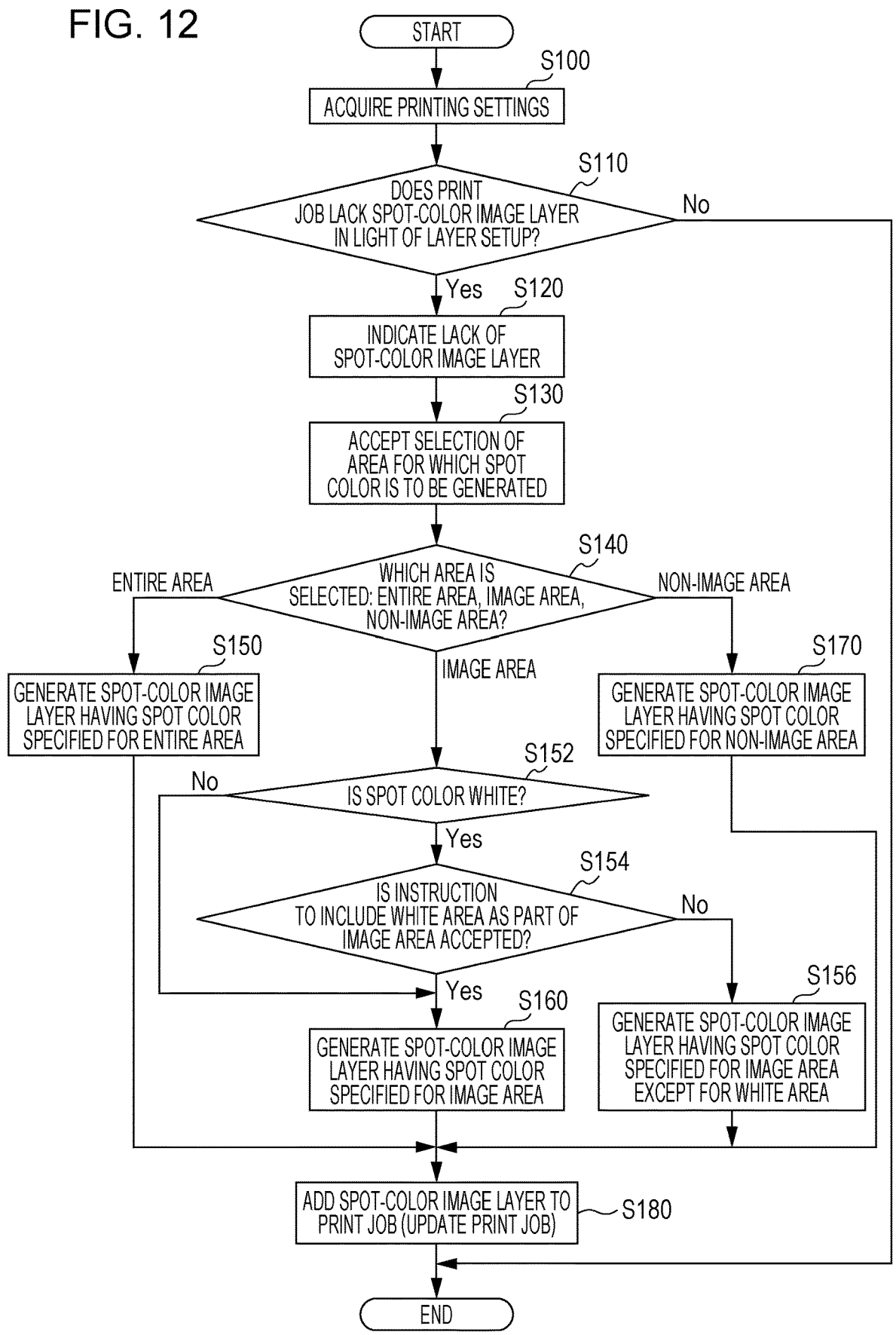
FIG. 12 is a flowchart illustrating spot-color image layer generation processing according to a modification.

FIG. 12 is a flowchart illustrating a modification of the spot-color image layer generation processing executed by the first control unit 11 in accordance with the image processing program 12. On the understanding that FIG. 6 has been already described above, FIG. 12 will be described below with a focus on differences between FIGS. 6 and 12. FIG. 12 differs from FIG. 6 in that FIG. 12 includes Steps S152 and S154 as branch points on a branch line extending from Step S140 to Step S160 and that either of Step S160 and Step S156 branching out from Step S154 is to be performed.

As mentioned above, the first control unit 11 branches, in Step S140, the processing in accordance with the selection accepted in Step S130. Referring to FIG. 12, when accepting, through the acceptance field 47, selection of "Image Part", namely, the image area, the first control unit 11 goes through Step S140 and proceeds to Step S152.

In Step S152, the first control unit 11 determines whether the spot color to be generated is white. When determining that the spot color to be generated is white, the first control unit 11 proceeds to Step S154. When determining that the spot color to be generated is not white, the first control unit 11 proceeds to Step S160. When the lack of a spot-color image layer determined in Step S110 means lack of a white plate, the first control unit 11 determines that the answer in Step S152 is "Yes". The first control unit 11 then proceeds to Step S154. When the lack of a spot-color image layer determined in Step S110 means lack of a clear plate or a metallic plate, the first control unit 11 determines that the answer in Step S152 is "No". The first control unit 11 then proceeds to Step S160.

In Step S154, the first control unit 11 determines whether to include the white area as part of the image area. The first control unit 11 may, for example, display, as illustrated in FIG. 10, a check box 48 located close to the acceptance field 47 in the printing settings pane 33. For example, the text "Include White Part of Image" is displayed close to the check box 48, in which the user can place a check mark as appropriate. The presence of a check mark in the check box 48 is an instruction to include the white area as part of the image area. The absence of a check mark in the check box 48 is an instruction not to include the white area as part of the image area.

When a check mark is placed in the check box 48, the first control unit 11 determines that the answer in Step S154 is "Yes". The first control unit 11 then proceeds to Step S160. When a check mark is not placed in the check box 48, the first control unit 11 determines that the answer in Step S154 is "No". The first control unit 11 then proceeds to Step S156. The check box 48 is an example item for enabling the determination in Step S154. Alternatively, the first control unit 11 may display, on the UI screen 30, both a first check box for accepting an instruction to include the white area as part of the image area and a second check box for accepting an instruction not to include the white area as part of the image area. When a check mark is placed in either of the first and second check boxes, the first control unit 11 may make a determination in Step S154 accordingly. In any case, the first control unit 11 is to perform either of Steps S160 and S156 in accordance with the user's selection of whether to include the white area as part of the image area. Selection of whether to include the white are as part of the image area is practically selection of whether to specify a recorded amount of the spot color (i.e., white) for the white area.

Step S160 is as described above. In Step S156, the first control unit 11 generates a spot-color image layer having a recorded amount of a specific color specified for the image area of the image layer included in the selected print job, with the white area not being included as part of the image area. That is, the first control unit 11 generates, as a spot-color image layer, image data whose size is equal to the size of the color image data included in the selected print job. Pixels in the generated image data that overlap the image area except for the white area each have a predetermined gradation value of W. Referring to FIG. 12, the first control unit 11 performs Step S180 subsequent to Step S150, S156, S160, or S170. In the absence of a white area as part of the image area of the image layer included in the selected print job, Step S160 and Step S156 yield the same result.

Figure 13:
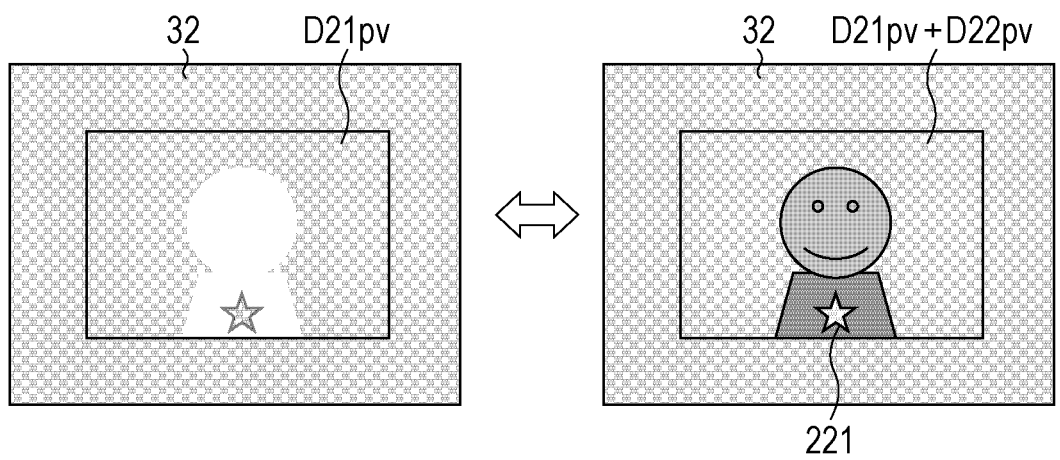
FIG. 13 illustrates another example preview that is displayed when "Image Part" is selected.

FIG. 13 is an enlarged view of part of the preview pane 32, illustrating a preview that is displayed in the preview pane 32 when "Image Part" is selected in the acceptance field 47. FIG. 13 is presented in like manner with FIG. 11B. Referring to FIG. 11B, the spot-color image data D21, which is a white plate generated in Step S160, is displayed as the spot-color image data D21$pv$. FIG. 13 differs from FIG. 11B in that the spot-color image data D21 displayed as the spot-color image data D21$pv$ is a white plate generated in Step S156. The portrait represented by the color image data D22$pv$, namely, the color image data D22 originally included as an image layer in the print job PJ3 includes a star-shaped area 221, which is a white area within the image area.

In Step S160, the spot-color image data D21 having a recorded amount of white ink specified for the portrait including the white area 221 is generated. In Step S156, the spot-color image data D21 having a recorded amount of white ink specified for the portrait except for the white area 221 is generated. Thus, as illustrated in FIG. 13, the spot-color image data D21$pv$ corresponding to the white plate generated in Step S156 does not have a gradation value of white ink specified for the star-shaped white area 221 on the chest part of the portrait. Consequently, the pattern of the background of the preview pane 32 is visible through the area corresponding to the white area 221. When displaying a preview, the first control unit 11 may subject, to transparency processing associated with the white area 221, the color image data D22$pv$, which is to be superposed on the spot-color image data D21$pv$. When the white area 221 is made transparent, the underlayer of the white area 221 can be seen through. Thus, the user can clearly recognize that white ink is recorded to the white area 221 or that white ink is not recorded to the white area 221.

For multilayer printing based on the color image data D22 and the spot-color image data D21 generated in Step S160, the white area 221 is recorded with white ink. For multilayer printing based on the color image data D22 and the spot-color image data D21 generated in Step S156, the white area 221 is not recorded with ink. This modification enables the user to select whether a recorded amount of white is specified for the white area of the image area. Depending on the selection, a spot-color image layer in which the white area is recorded with white ink may be generated or a spot-color image layer in which white area is not recorded may be generated.

The following describes a case in which a spot-color image layer is generated for a print job that includes both a first image layer representing an image and a second image layer representing another image. Assume that a print job (hereinafter referred to as a fourth print job) in which the color image data D01 and D03 illustrated in FIG. 2A are respectively included as the first and second image layers is added to the job list pane 31 of the UI screen 30. Although the spot-color image data D02, which is a white plate, is illustrated in FIG. 2A, the spot-color image data D02 is not included in the fourth print job at the point in time when the fourth print job is added to the job list pane 31. When the fourth print job is designated as the selected print job, the first control unit 11 executes spot-color image layer generation processing to generate the spot-color image data D02.

According to the printing settings acquired by the first control unit 11 in Step S100, the layer setup is "Three Layers (color→white→color)" and the media type is "Transparent Film". The fourth print job designated as the selected print job does not include a white plate. The first control unit 11 thus determines that the answer in Step S110 is "Yes" and then proceeds to Step S120 accordingly. After performing Step S120, the first control unit 11 accepts selection of "All" through the acceptance field 47 in the printing settings pane 33 (Step S130), goes through the branch point provided as Step S140, and proceeds to Step S150.

In Step S150, the first control unit 11 generates a spot-color image layer having a recorded amount of white specified for the entire area of the image layer included in the selected print job, that is, the first control unit 11 generates the spot-color image data D02 as a white plate. In this case, the size of the color image data D01 included in the selected print job may be equal to or may not be equal to the size of the color image data D03 included in the selected print job. When the size of the color image data D01 is not equal to the size of the color image data D03, the first control unit 11 generates, as a spot-color image layer, image data whose size is equal to the size of the color image data D01 or the size of the color image data D03, whichever is larger. All pixels in the generated image data each have a predetermined gradation value of W.

According to this modification, a print job includes a first image layer and a second image layer. When accepting, via the UI screen 30, both selection of the entire area and an instruction to print, on a printing medium, layers in the order of the first image layer (the color image data D01), the spot-color image layer (the spot-color image data D02) that is an intermediate layer between the first image layer and the second image layer and has a recorded amount of white, and then the second image layer (the color image data D03), the first control unit 11 generates a spot-color image layer having a recorded amount of white specified for an area corresponding to the size of the first image layer or the size of the second image layer, whichever is larger. When the size of the first image layer included in the print job is not equal to the size of the second image layer included in the print job, the first control unit 11 configured as described above generates a spot-color image layer that is a white plate serving as an underlayer large enough for both the first image layer and the second image layer. Thus, an appropriate result of multilayer printing is yielded through the use of the first image layer, the spot-color image layer, and the second image layer.

Needless to say, the configuration and design of the UI screen 30 are not limited to those illustrated in FIGS. 3, 7, and 10. For example, the elements described above as items included in the UI screen 30 may not be displayed on one UI screen. In some embodiments, several screens are provided so that switching between these screens on the display unit 13 may be performed to display desired elements.

What is claimed is:

1. An image processing device that receives an input from a user via a user interface screen displayed on a display unit, the image processing device comprising a control unit that is configured to perform the following:
   determine that a print job lacks a spot-color image layer in light of layer setup;
   in response to the determination, generating an indication, via the user interface screen, indicating the lack of spot-color image layer;
   receive, via the user interface screen, a selection of an area of at least one image layer included in the print job, the area being selected from one of an entire area of the at least one image layer, an image area that is included in the at least one image layer, and a non-image area that is included in the at least one image layer, and
   add a spot-color image layer having a spot color for the selected area to the print job.

2. The image processing device according to claim 1, wherein the spot-color image layer has a recorded amount of white specified for the selected area including a white area that has color information associated with white being the spot color.

3. The image processing device according to claim 1, wherein
   the control unit receives, via the user interface screen, selection of whether to specify a recorded amount of white for a white area that is included as part of the selected area and has color information associated with white being the spot color,
   when receiving selection of the recorded amount of white for the white area, the control unit adds a spot-color image layer having the recorded amount of white specified for the selected area including the white area, and
   when receiving selection in which the recorded amount of white is not specified for the white area, the control unit adds a spot-color image layer having the recorded amount of white specified for the selected area except for the white area.

4. The image processing device according to claim 1, wherein
   the print job includes the at least one image layer comprising a first image layer and a second image layer, and
   when receiving, via the user interface screen, both selection of the entire area and an instruction to print, on a printing medium, layers in an order of the first image layer, the spot-color image layer, and the second image layer, the control unit adds a spot-color image layer having a recorded amount of white as the spot color specified for an area corresponding to a size of the first image layer or a size of the second image layer, whichever is larger.

5. The image processing device according to claim 1, wherein the spot color is white, clear, or a metallic color.

6. A non-transitory computer-readable storage medium storing an image processing program that, when executed, causes a computer to receive an input from a user via a user interface screen displayed on a display unit, the executed image processing program configured to cause the computer to perform to perform the following:
   determine that a print job lacks a spot-color image layer in light of layer setup;
   in response to the determination, generating an indication, via the user interface screen, indicating the lack of spot-color image layer;
   receive, via the user interface screen, a selection of an area of at least one image layer included in the print job, the area being selected from one of an entire area of the at least one image layer, an image area that is included in the at least one image layer, and a non-image area that is included in the at least one image layer, and
   add a spot-color image layer having a spot color for the selected area to the print job.

* * * * *